United States Patent [19]

Hirai

[11] Patent Number: 5,198,849
[45] Date of Patent: Mar. 30, 1993

[54] REMOTE CONTROLLER FOR A CAMERA

[75] Inventor: Toshiaki Hirai, Yotsukaido, Japan

[73] Assignee: Seikosha Co., Ltd., Tokyo, Japan

[21] Appl. No.: 669,122

[22] Filed: Mar. 14, 1991

[30] Foreign Application Priority Data

Mar. 14, 1990 [JP] Japan .............................. 2-26012[U]
Mar. 8, 1991 [JP] Japan ................................... 3-43720

[51] Int. Cl.$^5$ ......................... G03B 7/00; G03B 13/20
[52] U.S. Cl. ................................... 354/410; 354/163
[58] Field of Search ............... 354/402, 403, 412, 410, 354/163

[56] References Cited

U.S. PATENT DOCUMENTS 4,764,786  8/1988  Tamura et al. ...................... 354/403
4,884,094  11/1989 Kitaura et al. ...................... 354/412
5,006,700  4/1991  Kosaka et al. ...................... 354/403
5,014,080  5/1991  Miyadera ............................. 354/403

Primary Examiner—L. T. Hix
Assistant Examiner—Jal N. Noh
Attorney, Agent, or Firm—Jordan and Hamburg

[57] ABSTRACT

A camera remote control device locally displays information that is derived in the camera. A remote control beam is transmitted from a remote control unit and received by a photo detector on the camera through a light intercepting lens. The received signal is processed in an arithmetic circuit and a CPU and a confirming signal is returned from a light emitting diode in the camera to a receiving circuit in the remote device, as a completion signal. The remote device is responsive to the completion signal to display the state of the camera.

9 Claims, 1 Drawing Sheet

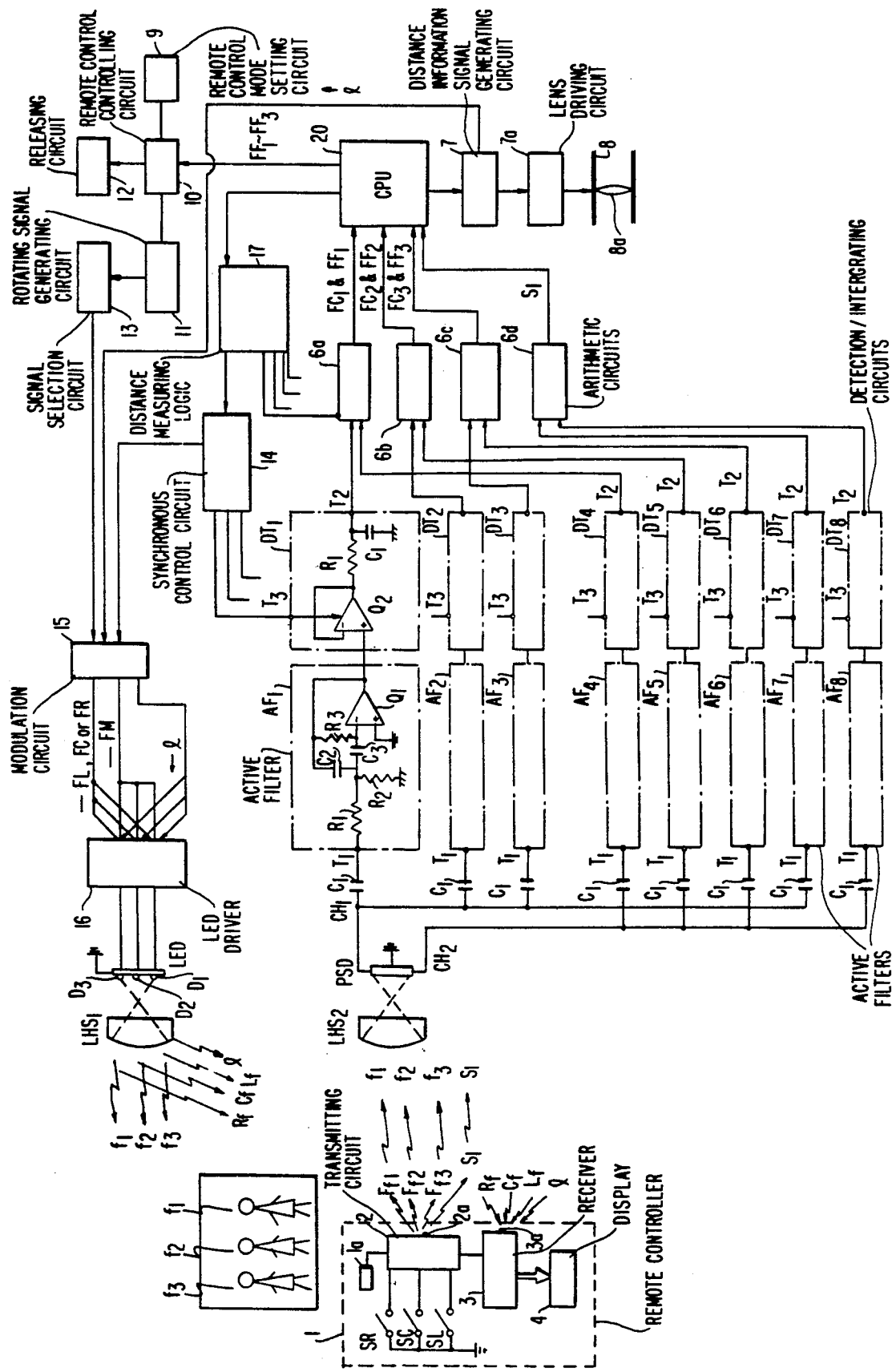

5,198,849

REMOTE CONTROLLER FOR A CAMERA

FIELD OF THE INVENTION

The present invention relates to a remote controller for a camera, and particularly, to a remote controller for a camera which can display an object position with respect to a frame under remote control as well as the distance to the object that is measured by a distance measuring device of the camera.

BACKGROUND OF THE INVENTION

A conventional automatic focus camera with a remote control function, wherein an AF beam for automatic focus and a remote control beam are transmitted from a remote control transmitter to a camera, is disclosed in Japanese Utility Model Application No. HEI 1-88909 (Application Date: Jul. 28, 1989, Title of the Device: Automatic Focus Camera with Remote Control Function). The above application discloses the technology of an automatic focus camera with a remote control function, in which the camera has a lens exclusively for the remote control beam, for the purpose of receiving the remote control beam, or a lens for both an AF beam and a remote control beam, so that a frame may be designated by the remote control beam. In the automatic focus camera a remote control function of the above arrangement, however, the problem arises that an object position with respect to a frame which is designated by a remote controller for the camera can not be displayed, and that it can not be confirmed whether the distance to the object is actually being measured or not.

SUMMARY OF THE INVENTION

The present invention overcomes the above problem, and the object of the present invention is to provide a remote controller for a camera with which the taking of an out of focus picture can be prevented, by providing the remote controller with a remote control beam transmitting circuit for transmitting a remote control beam to a camera, and by confirming the correctness of the control completion signal, especially of the object position that is displayed by an object position display and of the distance that is measured by the remote controller's receiving of a remote control beam confirming signal. The confirming signal is returned by the camera when the remote control beam is correctly received by the camera.

In order to attain the above object, the remote camera controller of the present invention comprises an information setting switch for selecting target information for the camera, a remote control beam transmitting circuit for transmitting to the camera a remote control beam which is selected by the information setting switch, a receiving circuit for receiving a remote control beam confirming signal from the camera, the signal being transmitted when the remote control beam is transmitted from the remote control beam transmitting circuit correctly controls the camera, and a display for displaying a set of information received when t he remote control beam confirming signal is received by the receiving circuit.

BRIEF DESCRIPTION OF THE DRAWING

In order that the invention may be more clearly understood, it will now be disclosed in greater detail with reference to the accompanying drawing, wherein:

The single FIGURE of the drawing is a block diagram of an embodiment of a remote controller for a camera according to the present invention.

DESCRIPTION OF THE PREFERRED EMBODIMENTS

In the drawing, numeral 1 designates a remote controller for a camera. The camera remote controller 1 has a release button 1a. One end of the button 1a is connected to a reference electric potential point. The controller also has a right peripheral object position setting switch SR, a central object position setting switch SC, a left peripheral object position setting switch SL, a remote control beam transmitting circuit 2 for transmitting a right peripheral remote control beam $Ff_1$, a central remote control beam $Ff_2$, and a left peripheral remote control beam $Ff_3$ to a remote control beam transmitting lens 2a, a receiving circuit 3 for receiving a right feed back signal Rf, a central feed back signal Cf, a left feed back signal Lf, and a distance information signal l from a signal receiving lens 3a, and a liquid crystal display 4.

The camera is provided with a remote control beam confirming signal selection circuit 13 which will be described. The remote control beam confirming signal selection circuit 13 selects either the right peripheral remote control beam confirming signal FR, the central remote control beam confirming signal FC, or the left peripheral remote control beam confirming signal FL, and the selected signal is transmitted from the multiplex modulation circuit 15 to a light emitting diode driving circuit 16. In the distance measuring sequence, when a distance measuring starting signal is applied by a CPU 20 to a distance measuring logic circuit 17, the light emitting diode driving circuit 16 is controlled by a synchronous control circuit 14, and a beam FM which is multiplexedly modulated by the multiplex modulation circuit 15 is projected to an object through a light projecting lens $LNS_1$. At the same time, a right peripheral multiplexedly modulated beam $f_1$, a central multiplexedly modulated beam $f_2$, and a left peripheral multiplexedly modulated beam $f_3$ are projected from light emitting diodes $D_1$, $D_2$, and $D_3$. The diodes are provided in a light emitting diode device LED. The central, left, and right multiplexedly modulated beams $f_2$, $f_3$, and $f_1$ are reflected from the object and enter a camera photo detector PSD through a light intercepting lens $LNS_2$, and the resultant signals go through left and right channels $CH_2$ and $CH_1$ of the photo detector PSD, and coupling capacitors $C_1$ . . . , and are inputted to terminals $T_1$ . . . of active filters $AF_n$ (n=1, 2, 3 are for the right channel $CH_1$ and n=3, 4, 5 are for the left channel $CH_2$). The active filters $AF_n$ apply the light intercepting signals through resistances $R_1$ and capacitors $C_3$ from the terminals $T_1$ and to the inverting inputs of operational amplifiers $Q_1$. The non-inverting input of each operational amplfier is connected to a reference electric potential point. The output of each of the active filters $AF_n$ is connected to first ends of separate resistances $R_3$. The other ends of the resistances $R_3$ are connected to the inverting inputs of the amplifiers Q. The nodes of the resistances $R_1$ and the capacitors $C_3$ are connected to first ends of the resistances $R_2$ and the other ends of these resistances $R_2$ are connected to a reference electric potential point. These nodes are also connected to first ends of separate capacitors $C_2$, and the other ends of the capacitors $C_2$ are connected to the first ends of the resistances $R_3$. The active filters $AF_n$ are band pass filters having frequencies determined by the capacitances of the capacitors $C_2$ and $C_3$ and the resistances of the resistances $R_1$, $R_2$, and $R_3$.

The outputs of the active filters $AF_n$ are connected to the non-inverting inputs of operational amplifiers $Q_2$. These operational amplifiers $Q_2$ are located in detection/integrating circuits $DT_n$ (wherein n is a number that corresponds to the suffix numerals of the respective circuit $AF_n$). The outputs of the operational amplifiers $Q_2$ are connected to terminals $T_2$ via resistances $R_4$ which form a part of the integrating circuits together with capacitors $C_4$, the capacitors being connected between the terminals and a reference electric potential point. The outputs of the operational amplifiers $Q_2$ are connected to the inverting inputs thereof. The operational amplifiers $Q_2$ are voltage followers, and effect synchronous detection due to the connections of the terminals $T_3$ to the synchronous control circuit 14. The outputs of the detection/integrating circuits $DT_1$ and $DT_4$, $DT_2$ and $DT_5$, and $DT_3$ and $DT_6$ are transmitted to the CPU 20 as central, left, and right distance data $FC_2$, $FC_3$, and $FC_1$ from arithmetic circuits 6a, 6b, and 6c. The CPU 20 calculates the inputted central, left, and right distance data $FC_2$, $FC_3$, and $FC_1$ and a focusing signal responsive to the central, left, and right distance data $FC_2$, $FC_3$, and $FC_1$ is transmitted to a distance information signal generating circuit 7. The distance information signal generating circuit 7 drives a lens 8a of a camera lens barrel 8 by a lens driving circuit 7a in response to the inputted focusing signal. The distance information signal generating circuit 7 also transmits a distance signal to the signal receiving lens 3a of the receiving circuit 3 through a multiplex modulation circuit 15. The right peripheral remote control beam $Ff_1$, the central remote control beam $Ff_2$, and the left peripheral remote control beam $Ff_3$ are transmitted to the light intercepting lens $LNS_2$ from the remote control beam transmitting lens 2a of the remote control beam transmitting circuit 2 of the remote controller 1, before the distance measuring sequence.

Detection and integration are effected in the remote control sequence, as well as in the distance measuring sequence, and the result is transmitted from the arithmetic circuits 6a, 6b, and 6c to the CPU 20 as right framing data $FF_1$, central framing data $FF_2$, or left framing data $FF_3$. The CPU 20 controls a remote control controlling circuit 10 in response to the inputted right framing data $FF_1$, the central framing data $FF_2$, or the left framing data $FF_3$. The remote control controlling circuit 10 controls a releasing circuit 12 in response to a condition which is set at a remote control mode setting circuit 9. The remote control controlling circuit 10 also controls a camera housing rotating signal generating circuit 11 so that a framing signal responsive to the control of the CPU 20 may be outputted. The camera housing rotating signal generating circuit 11 operates the remote control beam confirming signal selection circuit 13 when the determined framing signal is outputted and the camera housing is rotated.

The remote control beam confirming signal selection circuit 13 transmits the right feed back signal Rf, the central feed back signal Cf, or the left feed back signal Lf to the signal receiving lens 3a of the receiving circuit 3 through the light projecting lens $LNS_1$ from the light emitting diodes $D_1$, $D_2$, and $D_3$ in response to the right framing data $FF_1$, the central framing data $FF_2$, or the left framing data $FF_3$. This data is transmitted from the CPU 20 to the remote control controlling circuit 10.

The receiving circuit 3 controls the liquid crystal display 4 to display the object position with respect to the frame when the received right feed back signal Rf, the central feed back signal Cf, or the left feed back signal Lf coincides with the right peripheral remote control beam $Ff_1$, the central remote control beam $Ff_2$, or the left peripheral remote control $Ff_3$, these beams being transmitted from the remote control beam transmitting circuit 2. The release button 1a has a two-stage switch. When the release button 1a is pressed halfway, in the first stage, the distance is measured. When the release button 1a is pressed down completely, in the second stage, the circuit again transmits the right peripheral remote control beam $Ff_1$, the central remote control beam $Ff_2$, or the left peripheral remote control beam $Ff_3$ which coincides with the feed back signal, as a release signal.

In the remote camera controller of the above arrangement, when the remote control mode setting circuit 9 is in the remote control mode, if the right peripheral object position setting switch SR is operated, the right peripheral remote control beam $Ff_1$ is transmitted from the remote control beam transmitting circuit 2 to the light intercepting lens $LNS_2$. When the right peripheral remote control beam $Ff_1$ is transmitted from the remote control beam transmitting circuit 2 to the light intercepting lens $LNS_2$, the arithmetic circuit 6a is operated and transmits the right framing data $FF_1$ to the CPU 20. Then, the camera housing rotation signal generating circuit 11, under the control of the remote control controlling circuit 10, rotates the camera housing to the left and outputs the right framing signal $FF_1$ to a camera position operating motor (which is not shown) so that the right peripheral object may move to the center.

At the same time, the right feed back signal RF is transmitted to the receiving circuit 3 through the light projecting lens $LNS_1$. Then, in response to the coincidence of the received right feed back signal RF with the transmitted right framing signal $FF_1$, the receiving circuit 3 controls the liquid crystal display 4 to display that the center has now become the object position. In this case, the transmission of the right feed back signal Rf by the camera position operating motor in response to the right framing signal $Ff_1$ when the camera position control is completed employs the same concept.

Upon pressing the release button 1a halfway down, a distance measuring start signal S1 is transmitted from the remote control beam transmitting lens 2a of the remote control beam transmitting circuit 2. Then, in the same way as in the case of the framing signal as discussed above, the distance measuring start signal S1 is transmitted from the arithmetic circuit 6d to the distance measuring logic circuit 17 through the CPU 20 and the distance is measured. As discussed above, the distance information signal is transmitted to the multiplex modulation circuit 15, after the distance is measured, as the distance information signal, and thus, distance information is transmitted to the signal receiving lens 3a of the receiving circuit 3. In response to the received distance information signal, the receiving circuit 3 controls the liquid crystal display 4 to display the distance of the object.

When the release button 1a is pressed down completely in the second stage, since the right peripheral remote control beam $Ff_1$ is transmitted again, the remote control controlling circuit 10 controls the releasing circuit 12 and a sequence such as releasing the camera for an exposure operation and film winding is carried out.

In the above embodiment, the circuit for the distance measuring system is used also as the circuit for the remote controlling system. Another circuit exclusively for remote controlling may alternatively be provided. In a further alternative, the transmitted and received beams may be transmitted and received by electric waves, employing the electric wave principles, at least with respect to the confirming signal.

In the above embodiment, the setting switches SR, SC, and SL may be combined and controlled to effect, in one operation, the transmission of the remote control beam to the right, to the center, and to the left in this order, the operation being stopped at an appropriate position with the receiving circuit 3 controlling the display 4 to display the states one at a time. Alternatively, the remote control beam may be transmitted to the right, to the center, or to the left and with the display being made in a single operation, two successive operations, or three successive operations, respectively.

It is also within the concept of the present invention that a switch which combines the setting switches SR, SC, and SL may also be used as the release button 1a, and the switch may be made to indicate each function by varying the manner of operating of the switch.

The embodiment discussed above is an embodiment wherein an object position or distance information is displayed. However, it is possible to display information such as the brightness of an object, information relating to shutter speed, or information relating to light generation of a stroboscopic lamp, etc.

A remote controller for a camera according to the present invention comprises an information setting switch for designating target information of a camera, and a remote control beam transmitting circuit for transmitting to the camera a remote control beam which is selected by the information setting switch. The controller also includes a receiving circuit for receiving a remote control beam confirming signal, this signal being transmitted by the camera when the remote control beam provides the correct control in the camera, and a display for displaying a set information which is received when the remote control beam confirming signal is received by the receiving circuit. As a result, the correctness of the information which is displayed can be confirmed. Therefore, abnormal operation of the camera can be prevented from happening without large errors that occur as a result of the input of rough values by an operator.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. A remote controller for a camera, comprising an information setting switch for selecting target information for a camera, a remote control beam transmitting circuit for transmitting to the camera a remote control beam selected by the information setting switch, a receiving circuit for receiving a remote control beam confirming signal that is returned from the camera when the remote control beam from the controller is correctly received, and a display responsive to signals received by said receiving circuit for displaying setting information contained in said received signals and corresponding to information transmitted by said remote control beam in response to setting of said information setting switch.

2. A remote controller for a camera according to claim 1, wherein said display is connected to display the target position with respect to a frame when a received signal coincides with the remote control beam transmitted from the remote control beam transmitting circuit.

3. A remote controller for a camera comprising an object position designating switch for selecting one object position from central and peripheral object positions with respect to a frame of a camera, a remote controlling beam transmitting circuit for transmitting to the camera a remote control beam corresponding to the position selected by the object position selecting switch, a receiving circuit for receiving a remote control beam confirming signal when it is returned from the camera, when the remote control beam transmitted from the remote control transmitting circuit is correctly received, and an object position display for displaying the object position, said object position being selected by the remote control beam with respect to the frame when the remote control beam confirming signal is received by the receiving circuit.

4. A remote controller for a camera according to claim 3, wherein said display is connected to display an object position with respect to a frame when a received signal coincides with the remote control beam transmitted from the remote control beam transmitting circuit.

5. A remote controller for a camera, comprising an information setting switch for selecting target information for a camera, a remote control beam transmitting circuit for transmitting to the camera a remote control beam selected by the information setting switch, a receiving circuit for receiving a remote control beam confirming signal and a measured distance signal from the camera responsive to the reception of the remote control beam from the controller, and a display connected to display the reception of said confirming signal and a measured distance when the remote control beam confirming signal and the measured distance signal are received by the receiving circuit.

6. A remote control camera system comprising a remote controller and a camera, said controller comprising an information setting switch for selecting target information for a camera, and a remote control beam transmitting circuit comprising means for transmitting a remote control beam that contains selected target data corresponding to the target information selected by the information setting switch, said camera comprising means for receiving a remote control beam transmitted by said controller, means responsive to the receipt of said remote control beam for setting the camera in response to the selected target data, and means for transmitting a return beam containing data corresponding to the setting of the camera in response to said selected target data, said controller further comprising a receiving circuit for receiving said return beam, and a display responsive to signals received by said receiving circuit for displaying said data corresponding to the setting of the camera.

7. The remote control camera system of claim 6 wherein said information setting switch comprises means for selecting the position of an object with respect to a frame, said means for setting the camera comprises means for setting the position of an object view by the camera with respect to the frame of the camera, and said display comprises means for displaying the position of the object with respect to the frame as set by said camera.

8. The remote control camera system of claim 6 wherein said information setting switch comprises means for directing the setting of an object distance, said means for setting the camera comprises means for setting an object distance, and said display comprises means for displaying the object distance as set by said camera.

9. The remote control camera system of claim 7 wherein said means for transmitting of said camera comprises means for transmitting a confirmation signal responsive to receipt of a signal from the transmitting circuit of the controller by said means for receiving, and said display comprises means responsive to the receipt of said confirmation signal for enabling the display of said data corresponding to the setting of the camera.

* * * * *